Feb. 22, 1944.   N. A. HALLWOOD   2,342,468
FOOD PRESERVING AND STORAGE APPARATUS
Filed July 5, 1940   5 Sheets-Sheet 1

Inventor
*Nathan A. Hallwood*

By *W. S. McDowell*
Attorney

Feb. 22, 1944.   N. A. HALLWOOD   2,342,468
FOOD PRESERVING AND STORAGE APPARATUS
Filed July 5, 1940   5 Sheets-Sheet 2
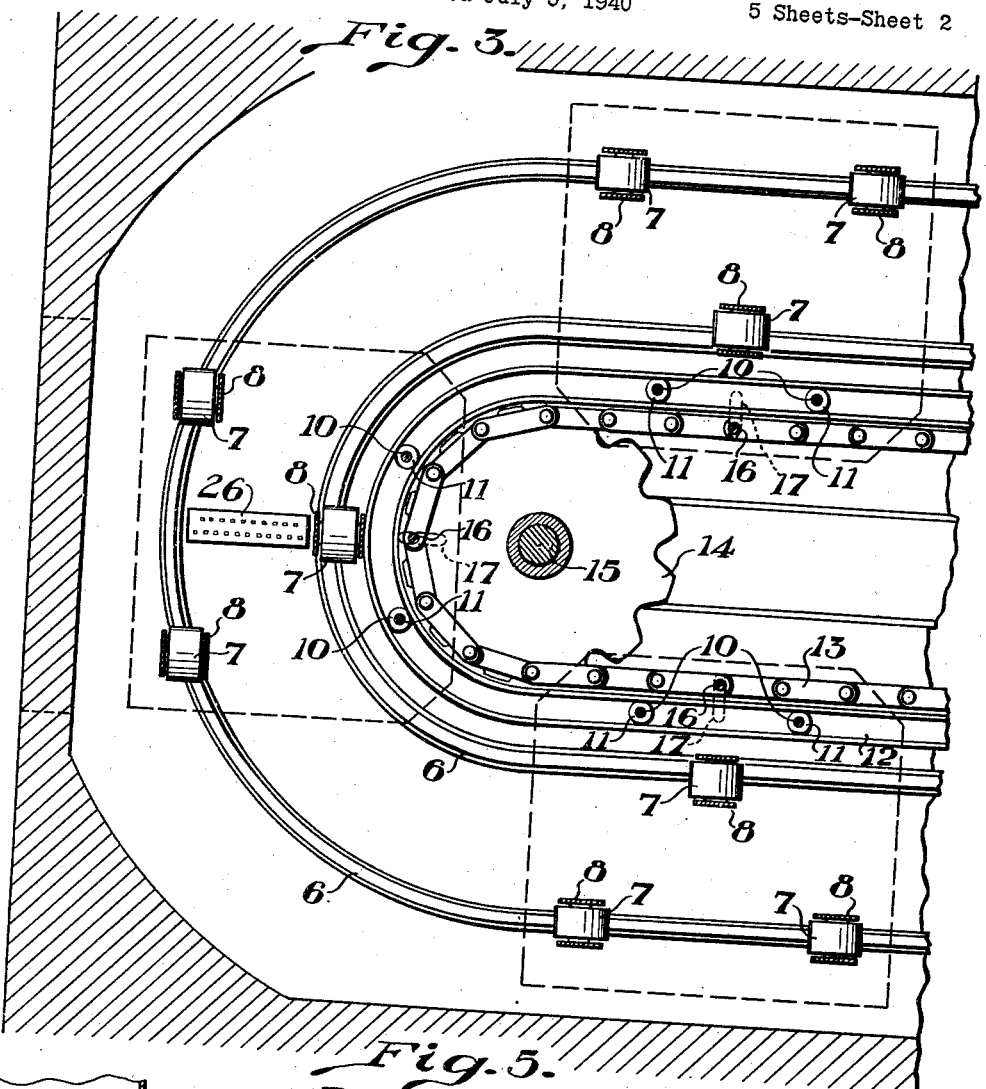
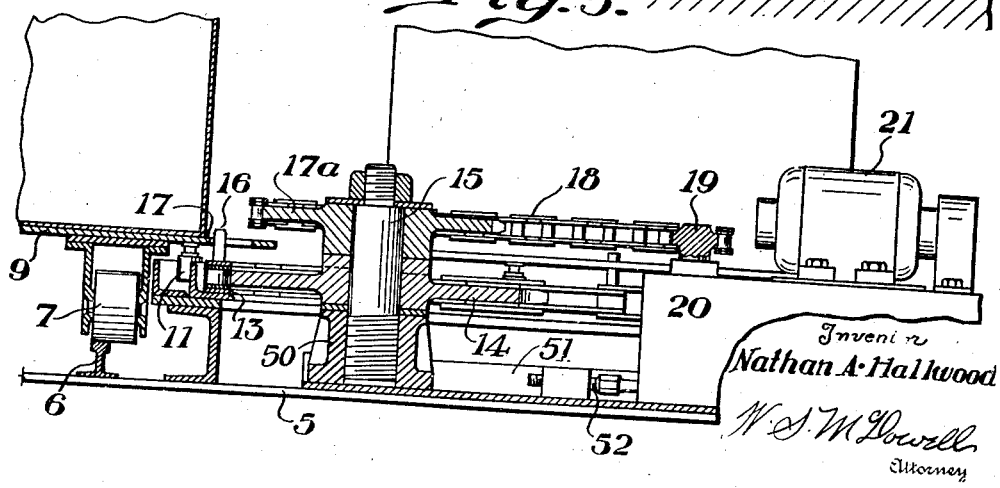
Inventor
Nathan A. Hallwood
W. S. McDowell
Attorney Feb. 22, 1944. N. A. HALLWOOD 2,342,468
FOOD PRESERVING AND STORAGE APPARATUS
Filed July 5, 1940 5 Sheets-Sheet 3
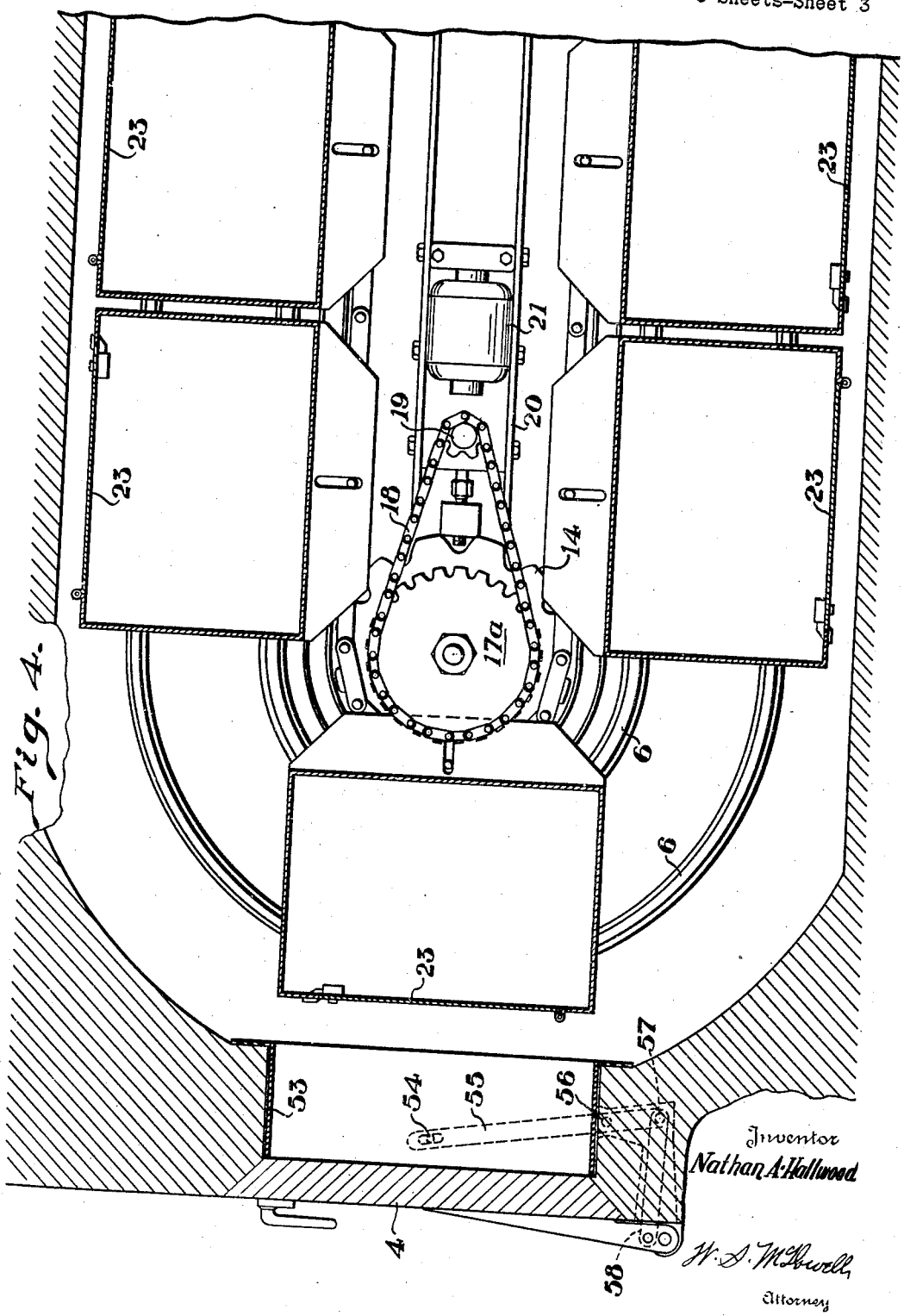

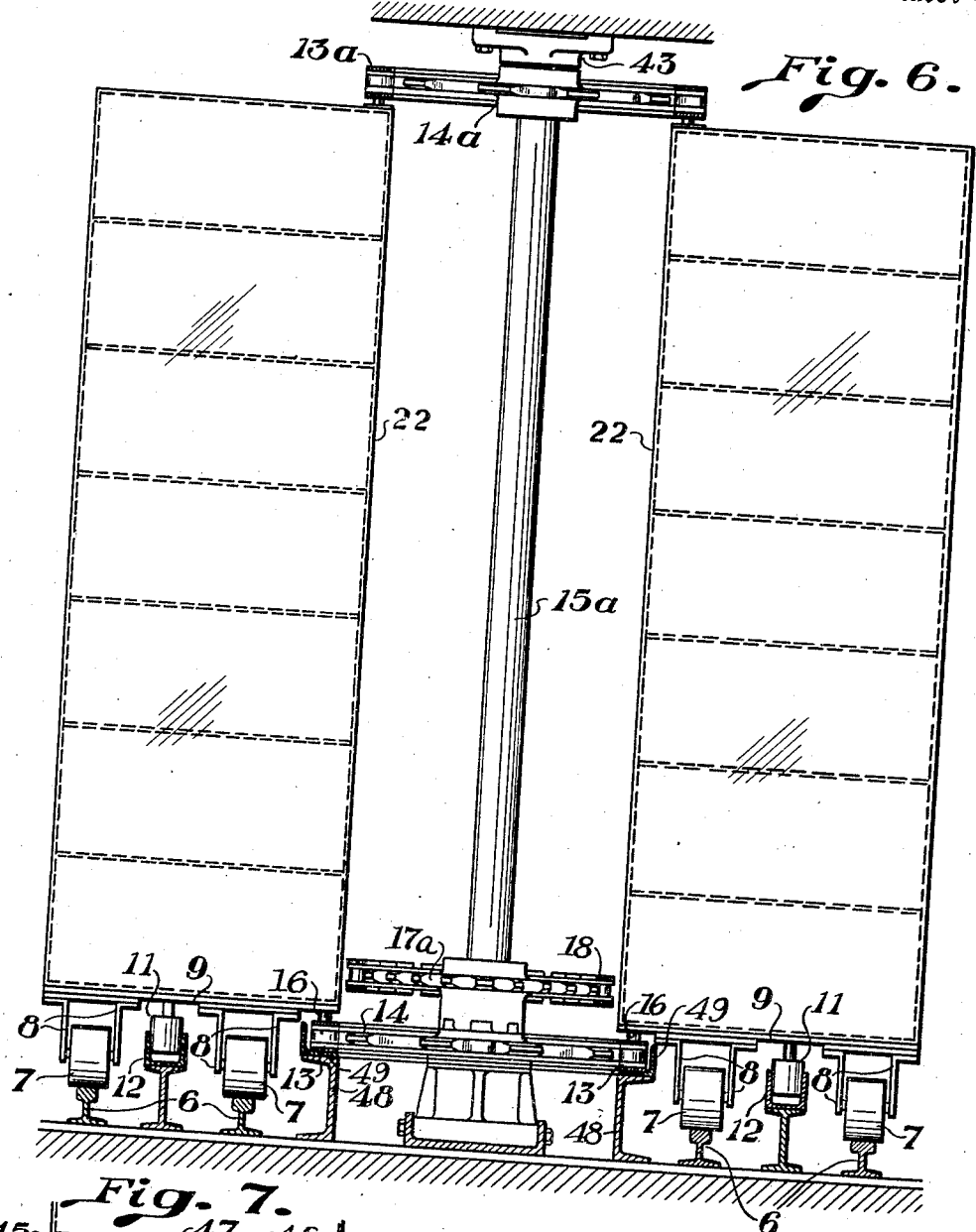

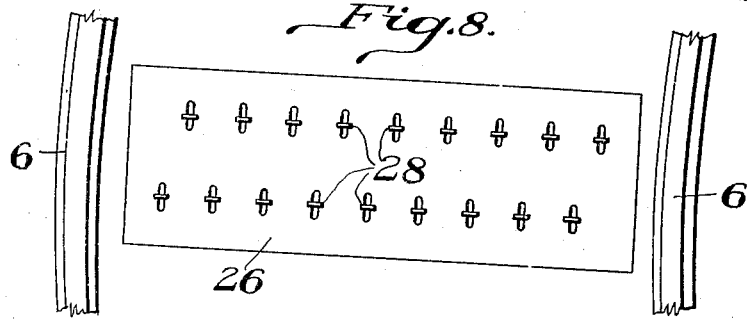

Patented Feb. 22, 1944

2,342,468

UNITED STATES PATENT OFFICE 2,342,468

FOOD PRESERVING AND STORAGE APPARATUS

Nathan A. Hallwood, Columbus, Ohio

Application July 5, 1940, Serial No. 344,124

4 Claims. (Cl. 198—181)

This invention relates to apparatus for preserving and storing foods and is particularly directed to an enclosure provided with a plurality of separate compartments which are intended to be leased to individual users, the entire enclosure being refrigerated in order that food articles placed in the compartments may be kept an indeterminate length of time without deterioration.

Relatively recently, it has been discovered that meats and produce can be successively preserved by subjecting them to a fast freezing operation at a low temperature and then storing the same in a place where the temperature is maintained slightly below the freezing point. To facilitate the operation of this system, it has been proposed to provide a refrigerated room in which a multiplicity of lockers are arranged, the lockers being leased to individual users who may purchase meat, fruit, berries, vegetables and similar articles in large quantities, have them fast frozen and place them in their lockers to be used later as desired. Through the use of such a system, the original freshness of the food can be preserved and great economy effected for the simple reason that by purchasing in large lots, the advantage of wholesale prices can be secured.

The most serious objection to the apparatus now in use for carrying out the system is that the lockers are arranged in the refrigerated room and the users are obliged to enter the cold room to remove the food from the lockers and thereby incur the danger of contracting colds or other sickness. The inconvenience of entering the cold locker room is particularly objectionable to women and since most of the purchasing or marketing is done by such persons, it tends to defeat the use of the system or at least prevent a more general use thereof.

The primary object of the invention therefore rests in the provision of apparatus for use in carrying out the system which will avoid the above objections by permitting the locker users to remain in a heated or more comfortable room and yet have access to their lockers.

Another object resides in providing a cold room in which a plurality of lockers are arranged on a train of carriers, means also being provided for moving the carriers to cause the successive registration thereof with the door leading to the cold room in order that the locker users may stand at the door and have access to a locker previously brought into registration therewith.

A further object rests in providing a trackway for the train of carriers mentioned above and power driven means for moving the carriers along the trackway, means being employed whereby a predetermined carrier may be caused to register with the door prior to the time of opening the same thus preventing an undue escape of refrigerated atmosphere from the storage room.

A still further object resides in providing the doorway leading to the cold room with a sleeve-like lining which is movably supported and is connected by suitable lever means with the door so that when the latter is swung to an open position, the lining will be caused to move toward the locker registering with the doorway, and partially surround it thereby closing the space between the door and the locker and preventing the flow of refrigerated air from the room.

It is also an object to provide a cold room with an endless trackway on which a plurality of wheeled carriers are positioned and to arrange an endless chain around a pair of spaced sprockets, one of which is power driven, means being employed to connect the carriers to the chain to effect movement of the former on the trackway, a vertically disposed group of locker compartments being carried by each carrier and successively registered with the door of the cold room upon movement of the carriers.

Another object is the provision of a second chain keyed for movement with the one above mentioned, the second chain being vertically spaced from the first and connected to the upper portion of the groups of lockers to prevent tipping thereof in the event the upper shelves are loaded sufficiently to make them top-heavy and power is suddenly applied to the carriers.

Other objects will be apparent from the following description and the accompanying drawings in which the invention has been illustrated in several forms.

In the drawings:

Fig. 3 is a horizontal sectional view taken through one end portion of one of the units on the plane indicated by the line III—III of Fig. 2;

Fig. 4 is a similar view taken on the plane indicated by the line IV—IV of Fig. 2 and shows the driving mechanism for a conveyor system employed in the unit;

Fig. 5 is a vertical longitudinal sectional view taken through the driving mechanism on the plane indicated by the line V—V of Fig. 4;

Fig. 6 is a vertical transverse sectional view taken through one end portion of a modified form of unit;

Fig. 7 is a detail vertical sectional view showing a still further modified form;

Fig. 8 is a plan view of a stop switch mechanism provided within the refrigerated enclosure for operation by the wheeled carriers of the conveyor system;

Fig. 9 is a vertical sectional view taken through the switch mechanism shown in Fig. 8;

Fig. 10 is a similar view showing one of the switches being actuated by a carrier;

Fig. 11 is a diagrammatic view of an electrical circuit used to provide for the selective registration of a group of lockers with the access opening of the refrigerated compartment.

Figure 1:
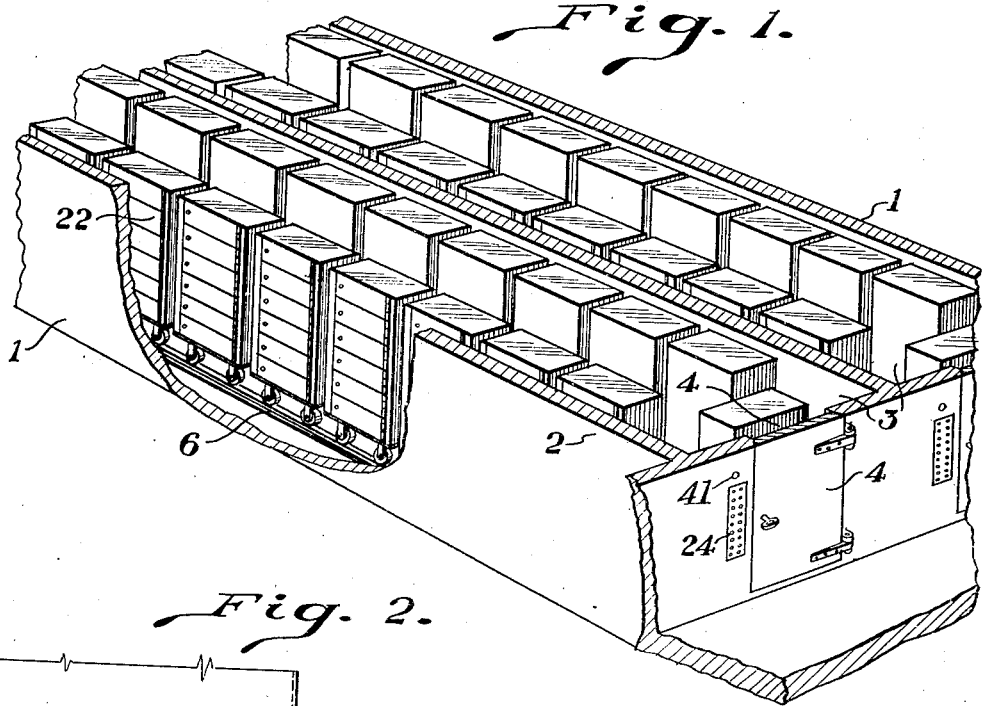
Fig. 1 is a perspective view of a portion of a building provided with two units of the food preserving and storage apparatus forming the subject matter of the present invention.

Referring more particularly to the drawings, the numeral 1 designates the walls of a building in which the food preserving and storage apparatus is installed. Any number of units of the apparatus may be employed in the building and each unit will be independent of the other. As illustrated in Fig. 1, the units may be disposed side by side or, if desired, any other arrangement may be employed. The building is provided with partition walls 2 which divide or separate the interior of the building into one or more compartments 3 which may be refrigerated in any desired manner.

One end wall of the compartment has an opening formed therein which is normally closed by a hinged door 4. The building walls may be formed from concrete or other suitable construction material and the surfaces of the walls within the compartment are covered with insulation to prevent the entrance of heat. The floor of the compartment has a plurality of transversely extending strips 5 which support rail members 6 which constitute a trackway of loop formation, the track having a pair of straight sections which extend longitudinally of the compartment and are connected at their ends by a pair of semicircular sections. This trackway provides for the continuous movement of a train of carriers through the compartment from one end to the other and back.

The rails 6 are engaged by roller members 7 journaled in bracket members 8 depending from the horizontal framework of carriers 9. The rollers are formed from straight sections of cylindrical material and may be provided with any desirable type of antifriction bearing. No flanges are provided on the rollers and a set of three rollers is provided for each carrier.

It will be noted that the brackets 8 are rigidly secured to the framework of the carriers and the wheels merely revolve about the axis around which they are journaled. No swivel means is necessary in the arrangement shown in this apparatus.

As illustrated in Fig. 3, the wheels are arranged on the carriers in such manner that the outermost track is engaged by two wheels while the inner track is engaged by only one. This arrangement provides a three-point bearing for each of the carriers and eliminates swiveled wheels. It also eliminates friction between the wheels and the track when the carriers move around the bends at the ends of the compartment. The carriers are guided and maintained on the trackway by providing each thereof with a plurality of downwardly directed pivot pins 10 on which rollers 11 are journaled. These rollers are disposed in a channel-shaped guide 12 which is in parallel relation with the trackway. The guide in the first form is shown within the space enclosed by the trackway while in the second form, the guide is placed between the rails of the track. In each instance, the guide is channel-shaped and the rollers are between the flanges. This arrangement will maintain the carriers on the trackway and guide the carriers around the looped ends. Due to the use of the guideway and the rollers, each carrier will be in the same position relative to the door when the carrier is in registration therewith or at the same end of the compartment.

To effect the movement of the carriers and maintain their relation in the train, an endless chain 13 has been provided in the lower portion of the compartment in the space enclosed by the trackway. The chain is trained around a pair of spaced sockets 14 journaled for rotary movement around vertical shafts 15. Spaced pivot pins of the chain have upwardly directed extensions 16 thereon, these extensions being disposed within slotted openings 17 formed in the framework of the carriers. Through the use of the pins in the slots, the carriers will be secured for movement with the chain and the position relative to the length of the chain will be maintained. This construction spaces the carriers a required distance to prevent their engagement when the carriers are being moved along the track. Longitudinal movement is imparted to the chain by connecting a third sprocket 17a with one of the sprockets 14 and passing a driving chain 18 around the third sprocket and a smaller sprocket 19 which is journaled in a gear reduction mechanism 20. Power is introduced to the mechanism 20 by a suitable electric motor 21 also arranged in the first form within the space between the longitudinal sections of the trackway. When electrical current is introduced to the motor 21, motion will be imparted to the chain 18 and this motion will in turn be transferred to the chain 13 through the sprockets 17 and 14 and movement to the train of carriers will be imparted.

During this movement of the carriers, they will successively register with the door 4 and when the latter member is opened, access may be had to groups of locker members 22 supported in vertical order on the carriers. The locker members will preferably be formed of sheet metal and will include a plurality of shelves which divide each locker into a group of compartments, a door 23 being arranged in the front wall of each compartment. Lock means prevent unauthorized access to the compartments and each user will be given a key for his individual locker.

If desired, an automatic brake mechanism may be employed to stop the movement of the train when the desired group of lockers is in registration with the door.

It is desirable to provide means for causing the selective registration of the compartments with the door and to that end, the switch mechanism and circuits therefor shown in Figs. 8 to 11 have been provided.

It will be understood that the switch mechanism shown is one of many suitable forms and the construction thereof does not form a part of this invention, the particular mechanism being employed merely for illustrative purposes. This switch mechanism includes a group of switches 24 which are mounted on a panel at the side of the door 4, one switch being provided for each carrier. When it is desired to cause the registration of a particular group of lockers with the door, the switch corresponding to this group of lockers will be actuated and the train of cars set in motion. When the desired group of lockers is in registration with the door, the carrier therefor will engage a normally closed switch and current flow to the motor will be interrupted. The switches 25 employed to stop the movement of the train are carried within a housing 26 in the floor of the compartment between the rails. It is necessary to provide one stop switch for each carrier and to arrange the actuating extremities of the switches in such relation that each will be operated when the corresponding carrier moves over the housing 26. Each carrier is provided with a depending switch operating rod 27 which will engage the actuating extremity 28 of its corresponding switch. The switches 25 may be of any suitable form, but for purposes of illustration, switches such as shown in Figs. 9 and 10 have been selected.

These switches each include a circular dielectric container 29 which is divided into a pair of compartments between which communication is established through a slot 30 formed in the division wall. This slot is rather narrow and extends vertically of the wall substantially in the central portion thereof. The container has a quantity of mercury therein, this material providing for current flow between metal contacts secured to the ends of the container. When the switch is in a normal position as illustrated in Fig. 9, current flow will be established by the mercury but when the switch is tilted through the engagement of the actuating extremity by the bar 27 to the position shown in Fig. 10, the slot in the partition wall will be above the level of the mercury and current flow through the switch will be precluded.

In the circuit shown in Fig. 11, the switches 24 are illustrated as being of the electromagnetic, normally open type which includes a field coil 31, a movable bridging member 32 and a pair of spaced contacts 33 and 33a. The first contact is connected by a line 34 to one power line 35 while the other contact is connected by a line 36 to one terminal of the electric motor 21, the other terminal of this motor being connected by the line 37 with the second power supply line 38. When the switch is manually actuated to cause the bridge member to engage the spaced contacts, current will flow through the motor and movement will be imparted to the train of carriers as before mentioned.

To hold the member 32 in a circuit closing position, the coil 31 is connected with the contact 33a and the opposite end of the coil receives current from the line 38 through a wire 39. Thus when the switch member 32 is actuated, current will flow through the coil 31 and energize this member. When the coil is energized, a magnetic field will be set up causing the attraction of an armature 40 which is connected with the bridge 32. By reason of the magnetic attraction, the armature will be held within the coil and the bridge will be held in engagement with the contacts 33 and 33a permitting the operator to release the switch button and yet the operation of the conveyor will continue.

A switch 25 is connected in the line 39 so that when the actuating member of the switch 25 is engaged by the bar on the carrier corresponding to the selector switch previously actuated, the switch 25 will be moved to a position to interrupt current flow through the coil 31. When this current flow is interrupted, the bridge 32 will move out of engagement with the contacts and the circuit to the motor 21 will be broken. The movement of the conveyor will then be discontinued, leaving the carrier which actuated the switch 25 in registration with the door 4.

A signal light 41 may be connected in the line 34 and disposed outside the door 4 to inform the operator as to the time when the conveyor ceases operation since the light 41 will be extinguished when the switch 24 is opened. A safety switch 42 may also be positioned in the line 34, the switch being moved to a circuit breaking position when the door is opened. The use of this switch will prevent the introduction of power to the driving motor 21 when the door 4 is in an open position. A number of switches 24 will be employed, the number corresponding to the number of carriers on the train. Each of the switches 24 is identical with the others and the above description of one is believed to be sufficient. The circuit controlled by each switch is also provided with a carrier operated switch 25, these being identical.

In some instances, the upper lockers on one or more carriers may be heavily loaded while the lower portions may be empty or lightly loaded. Thus, there may be a tendency for the lockers to tip when the train is started or stopped. To overcome this tendency, the structure shown in Fig. 6 may be employed. The shafts 15a extend upwardly and are received within bearings 43 secured to the top wall of the enclosure. The upper portions of the shafts 15a have sprockets 14a keyed thereto and these sprockets receive the links of an endless chain 13a. Spaced pivot pins of the chain 13a are connected with the upper ends of the lockers in vertical registration with the connections between the lower chain and the lockers. Thus when motion is imparted to the lower chain, similar movement will be imparted to the upper chain and the upper ends of the lockers will move in unison with the lower ends to prevent tipping.

It may be found desirable in some installations when the guide rollers 11 are disposed between the trackway to apply the power to move the carrier thereto at a point between the trackway preferably in registration with the guide means. The mechanism for carrying out this purpose is illustrated in Fig. 7 wherein the carrier frame includes spaced members 44 and 45 between which an arm 46 is arranged. This arm is connected with the carrier by a pin 47 which passes through one end of the arm while the other end of the arm is secured to the lower chain. When movement is imparted to the chain, the arm 46 will move in unison therewith and similar movement will be transmitted by the arm to the carrier through the pin 47. The opening in the arm through which the pin 47 extends will of necessity be in the form of a slot corresponding to the slot 17 in the first form.

Since the chain 13 will be obliged to move quite heavy loads, the chain will be of considerable size. To avoid the tendency of this chain to sag, the cross members 5 are provided with supporting channel beams 48 on which angle members 49 are laid. These angle members register with the longitudinal runs of the chain and prevent sagging thereof between the sprockets. The members 49 may be extended around the sprockets 14 or, if desired, the sprockets may be employed to support the chain while it is in engagement therewith. The members 48 in the first form of the invention also support the channel for the guide rollers 11. In the second form, I-beams are disposed between the tracks to perform this function.

Figure 2:
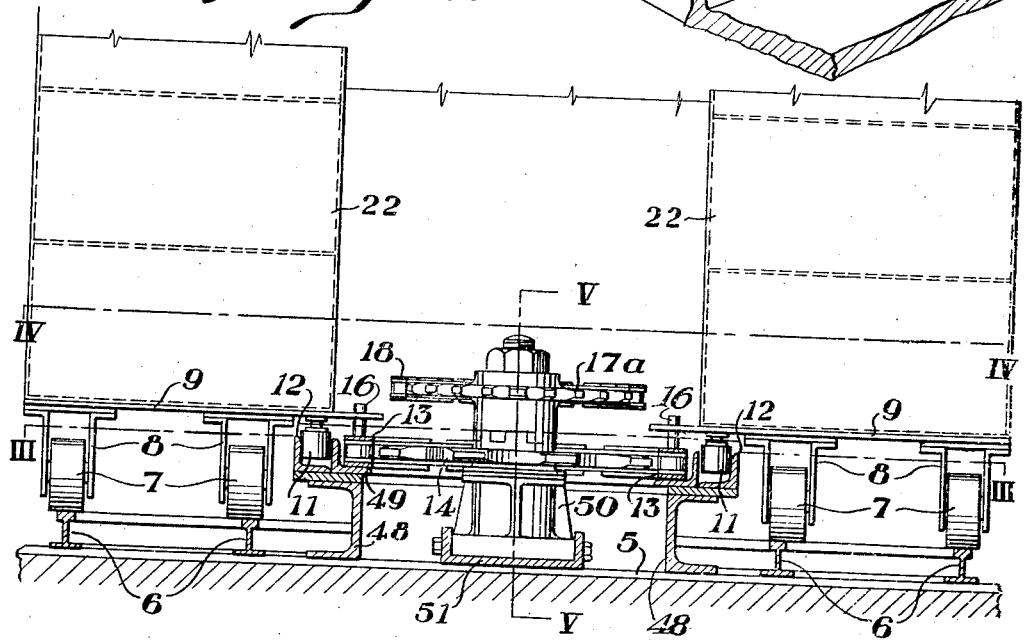
Fig. 2 is a vertical transverse sectional view taken through the lower portion of one of the units shown in Fig. 1.

As illustrated in Fig. 2, the shafts 15 are carried by base members 50 which are disposed for longitudinal adjustment in a channel member 51 carried by the cross members 5. The member 50 is adjustable to increase the tension of the chain 13 to prevent undue lost motion. The channel 51 also carries the reduction gear mechanism and adjusting means 52 are provided to vary the spacing between the reduction gear housing and the driving sprocket 17 to vary the tension on the driving chain 18.

If some provisions were not made, large quantities of cool air would flow outwardly through the door 4 when open. To avoid this danger, the doorway, as illustrated in Fig. 4, is provided with a lining member 53 which is slidably positioned in the doorway for movement longitudinally therein. The sleeve is formed with pin members 54 at its upper and lower ends and these pins project through slotted openings formed in levers 55. The levers are pivoted intermediate their ends as at 56 to the wall of the compartment while the opposite ends of the levers are connected as at 57 by links 58 to the door adjacent to the pivotal axis. When the door is swung on its pivots, movement will be transmitted to the levers 55 by the links 58 and the sleeve will be caused to move with the levers into the position illustrated in dotted lines in Fig. 4. The lining sleeve is slightly larger than the group of lockers so that the inner edge of the lining will pass around the outer sides of the lockers and seal the space between the lockers in registration with the doorway and the doorway itself. Thus, the tendency of the cool air to flow through this space will be materially lessened. When the door is closed, the sleeve will move back into the doorway toward the door and away from the locker so that the train may be moved without danger of breaking the doorway lining or the lockers.

The driving motor has been shown in the space between the longitudinal sections of the track, but it is obvious that this motor could be located exteriorly of the compartment and power transmitted through shafts and gearing to the sprockets.

The principles set forth in this application are equally applicable to other types of food storage equipment, such as the display cases set forth in my prior application Serial No. 192,237 filed Feb. 24, 1938, and allowed December 28, 1939, of which this application is a continuation-in-part, the prior application being voluntarily forfeited in favor of the present application.

While the invention has been illustrated in several forms, other modifications may be provided by changing the construction of the various parts and the combination thereof without departing from the spirit and scope of the invention as set forth in the following claims.

What is claimed is:

1. A conveyor for supporting and moving material comprising driving and idler pulley members journaled in spaced relation for rotary movement about vertical axes, an endless flexible motion transmitting element extending around said members, means for adjusting one of said members to vary the spacing therebetween and eliminate slack in said motion transmitting element, an endless guide disposed in parallel relation to said flexible element, a plurality of wheeled carriers, a plurality of follower elements mounted on each carrier and cooperating with said guide to confine said carriers to a predetermined path of movement, and means secured to said flexible element for movement in unison therewith, said means having adjustable connections with said carriers to compensate for variations caused by adjustment of said pulley member.

2. A conveyor for supporting and moving material comprising driving and idler pulley members journaled in spaced relation for rotary movement about vertical axes, an endless flexible motion transmitting element extending around said members, an endless guide disposed in parallel relation to said flexible element, a plurality of wheeled carriers, a pair of followers secured to each carrier and cooperating with said guide to confine said carriers to a predetermined path of movement, a slotted socket in each of said carriers, and coupling projections carried by said flexible element and positioned in the slotted sockets in said carriers to transmit movement from the flexible element to the carriers, said slotted sockets compensating for variations in distance between said guide and said flexible element.

3. A conveyor for supporting and moving material comprising driving and idler pulley members journaled in spaced relation for rotary movement about vertical axes, an endless flexible motion transmitting element extending around said members, an endless guide disposed in parallel relation to said flexible element, spaced parallel track rails extending in parallel relation to said endless guide, a plurality of carriers, a set of three caster wheels journaled on each carrier for engagement with said rails, one caster on each carrier engaging the rail nearest said guide, a pair of follower members supported by each carrier, said followers cooperating with said guide to maintain said caster wheels on said rails, and means for loosely coupling said carriers to said flexible element whereby linear movement of the latter will be transmitted to the carriers, the looseness of the coupling permitting relative lateral movement between said carriers and said flexible element.

4. A conveyor for supporting and moving material comprising driving and idler pulley members journaled in spaced relation for rotary movement about vertical axes, an endless flexible motion transmitting element extending around said members, an endless guide disposed in parallel relation to said flexible element, a plurality of carriers, a set of three caster wheels journaled on each carrier to movably support the same, one caster being disposed in closer relationship to said guide than the other two casters, a follower member mounted on each carrier on opposite sides of the caster nearest said guide, said follower members engaging said guide to fix the path of travel of said carriers, and means between the follower members on each carrier for loosely coupling the latter to said flexible element whereby linear movement of said element will be transmitted to said carriers while limited lateral movement of either will not affect the other.

NATHAN A. HALLWOOD.